(12) United States Patent
Al-Deraiei

(10) Patent No.: US 10,378,786 B2
(45) Date of Patent: Aug. 13, 2019

(54) ENERGY EFFICIENT AIR CONDITIONER

(71) Applicant: Waleed KH. A. KH. Al-Deraiei, Safat (KW)

(72) Inventor: Waleed KH. A. KH. Al-Deraiei, Safat (KW)

( * ) Notice: Subject to any disclaimer, the term of this patent is extended or adjusted under 35 U.S.C. 154(b) by 0 days.

(21) Appl. No.: 16/160,961

(22) Filed: Oct. 15, 2018

(65) Prior Publication Data
US 2019/0178526 A1    Jun. 13, 2019

Related U.S. Application Data

(60) Provisional application No. 62/595,992, filed on Dec. 7, 2017.

(51) Int. Cl.
| | | |
|---|---|---|
| *F24F 12/00* | (2006.01) | |
| *F24F 13/20* | (2006.01) | |
| *F24F 5/00* | (2006.01) | |

(52) U.S. Cl.
CPC .............. *F24F 12/00* (2013.01); *F24F 5/001* (2013.01); *F24F 13/20* (2013.01)

(58) Field of Classification Search
CPC .......... F24F 12/00; F24F 1/0041; F24F 13/20; F24F 2013/202
See application file for complete search history.

(56) References Cited

U.S. PATENT DOCUMENTS

| | | | |
|---|---|---|---|
| 6,745,587 B1 | 6/2004 | Hille et al. | |
| 7,370,490 B2 * | 5/2008 | Li | F24F 1/0003 62/305 |
| 2005/0011211 A1 * | 1/2005 | Hille | B60H 1/00371 62/244 |
| 2008/0250800 A1 | 10/2008 | Wetzel | |

FOREIGN PATENT DOCUMENTS

| | | |
|---|---|---|
| CN | 105890070 A | 8/2016 |
| CN | 205897382 U | 1/2017 |

OTHER PUBLICATIONS

Felts et al. "Energy savings from indirect evaporative pre-cooling: Control strategies and commissioning." No. CONF-980815-. Pacific Gas and Electric Co., San Francisco, CA (US), 1998.

* cited by examiner

*Primary Examiner* — Elizabeth J Martin
(74) *Attorney, Agent, or Firm* — Richard C. Litman

(57) ABSTRACT

An energy efficient air conditioner is configured to use a portion of cooled indoor air to cool a condenser in a continuous evaporation-compression-condensation cycle. Ambient air from an indoor environment enters a housing of the air conditioner through a first air inlet. A first fan draws the air over an evaporator coil for cooling, and after cooling, directs the air back into the indoor environment through a first air outlet. A second fan draws a portion of the cooled air (e.g., a cooled exhaust air stream drawn from ventilated areas of a house) back into the housing through a second air inlet, where it is passed over a condenser coil. Heat exchange with the condenser coil creates heated exhaust, and the second fan directs the heated exhaust out of the housing, into an outdoor environment, through a second air outlet.

5 Claims, 1 Drawing Sheet

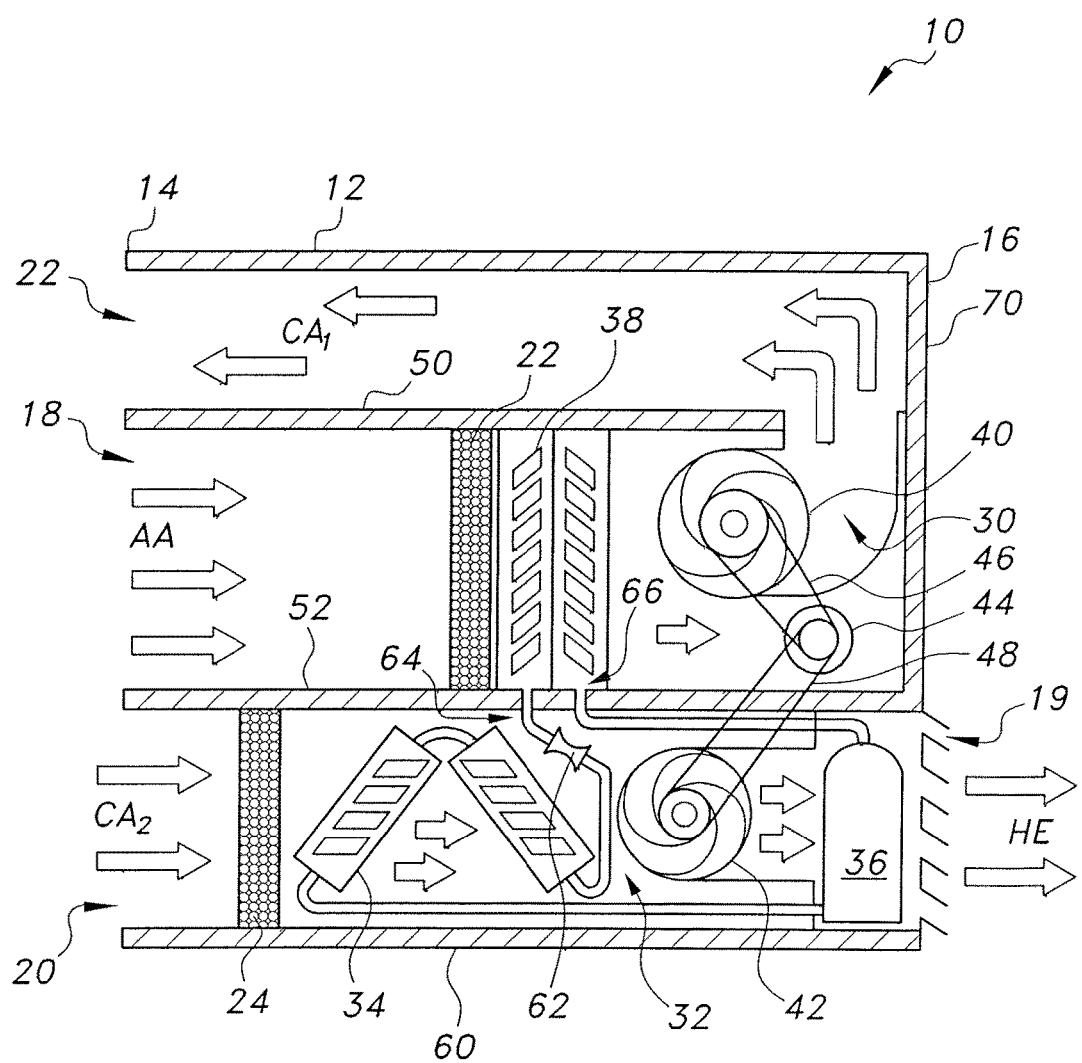

ENERGY EFFICIENT AIR CONDITIONER

CROSS-REFERENCE TO RELATED APPLICATION

This application claims the benefit of U.S. Provisional Patent Application Ser. No. 62/595,992, filed on Dec. 7, 2017.

BACKGROUND

1. Field

The disclosure of the present patent application relates to air conditioning, and particularly to an energy efficient air conditioner that is an evaporation-condensation cycle-type air conditioner that uses recirculated cooled air to cool the condenser.

2. Description of the Related Art

In a typical evaporation-condensation cycle type air conditioning system, an evaporator coil receives a volume of liquid refrigerant, such as R22 or the like, and air to be cooled is driven by a fan, blower or the like to pass over the evaporator coil. Heat exchange between the flowing air and the liquid refrigerant in the evaporator coil causes the liquid refrigerant to undergo a phase change and become gaseous refrigerant while heat is extracted from the flowing air. The gaseous refrigerant is then passed to a compressor, which pressurizes the gaseous refrigerant and delivers it as a pressurized gas to a condenser coil. A second air stream, typically from the outside environment, is delivered across the condenser coil for a reverse heat transfer process, i.e., the second air stream is used to cool the pressurized gaseous refrigerant in the condenser coil such that it condenses back into liquid refrigerant, which is then recirculated to the evaporator coil, creating a continuous cycle. This heat transfer process heats the second air stream, which is then vent back to the outside environment as hot exhaust. In such an air conditioning system, the overall efficiency of the condensation part of the cycle is dependent upon the initial temperature of the second air stream. In a naturally hot region, the second air stream, which is drawn from the outside, may be quite warm, thus reducing the overall efficiency of the air conditioner.

As an example, during the summer in Kuwait, external daytime air temperatures may be in the range of 48° C.-55° C. (representative of typical hot and dry desert weather), thus requiring continuous air conditioner operation and a large energy expenditure to overcome the naturally inefficiency caused by the ambient environment's temperatures. In a typical air conditioner, this limitation sets a limit on efficiency of the air conditioning system. For example, for a desired indoor temperature of approximately 24° C., such an air conditioner can only produce the desired results if the outside air temperature is less than approximately 46.6° C. Above that outside air temperature, even with continuous operation, the air conditioner system may not be able to produce the desired indoor air temperature. Thus, an energy efficient air conditioner solving the aforementioned problems is desired.

SUMMARY

The energy efficient air conditioner uses a portion of cooled indoor air to cool the condenser coil of the air conditioner. The cooled indoor air may come from, for example, ventilated areas of a house, such as bathrooms, kitchens, stairways, etc. Areas such as these typically have exhaust systems for venting odoriferous or stale air. The energy efficient air conditioner allows for recycling of this vented air. The energy efficient air conditioner includes a housing having first and second longitudinally opposed ends, the first end being adapted for positioning within an indoor environment to be cooled, such as within a room of a house or building, and the second end being positioned in, or communicating with, the outdoor environment. First and second air inlets and a first air outlet are formed through the first end of the housing to communicate with the indoor environment to be cooled. A second air outlet is formed through the second end of the housing for expelling heated exhaust into the outdoor environment. First and second chambers are defined within the housing, the first chamber being in open fluid communication with the first air inlet and the first air outlet, and the second chamber being in open fluid communication with the second air inlet and the second air outlet.

A compressor and a condenser coil are housed within the second chamber. As in a conventional evaporation-condensation cycle air conditioner, the compressor delivers pressurized gaseous refrigerant to the condenser to be condensed into liquid refrigerant. An evaporator coil is housed within the first chamber and is in fluid communication with the compressor coil and the condenser. Similar to a conventional evaporation-condensation cycle air conditioner, the liquid refrigerant is circulated from the condenser coil to the evaporator coil, where the liquid refrigerant is evaporated into gaseous refrigerant, which is then circulated to the compressor, forming a continuous evaporation-compression-condensation cycle.

A first fan is housed within the first chamber for driving ambient air from the indoor environment to enter the first air inlet and be cooled by passing over the evaporator coil, thus producing a stream of cooled air. The first fan further drives the stream of cooled air to exit the housing through the first air outlet, delivering the stream of cooled air into the indoor environment. A second fan is housed within the second chamber for driving a portion of the stream of cooled air (i.e., the cooled exhaust air stream drawn from ventilated areas of the house), which has been delivered to the indoor environment, to enter the second air inlet to pass over the condenser coil. The portion of the stream of cooled air that is recirculated through the housing is used to cool the condenser coil while being heated through heat exchange therewith. The stream of heated exhaust created through heat exchange with the condenser coil is driven by the second fan to exit the housing through the second air outlet, out into the outdoor environment.

These and other features of the present disclosure will become readily apparent upon further review of the following specification and drawings.

BRIEF DESCRIPTION OF THE DRAWINGS

The sole drawing FIGURE is a schematic diagram showing an energy efficient air conditioner.

Similar reference characters denote corresponding features consistently throughout the attached drawings.

DETAILED DESCRIPTION OF THE PREFERRED EMBODIMENTS

As shown in the sole drawing FIGURE, the energy efficient air conditioner 10 includes a housing 12 having first and second longitudinally opposed ends 14, 16. The first end 14 is adapted for positioning within an indoor environment to be cooled, such as within a room of a house or building. The second end 16 is adapted to be positioned in, or communicating with, the outdoor environment. A condenser coil 34, an evaporator coil 38, and a compressor 36 are disposed within the housing. First and second air inlets 18, 20, respectively, and a first air outlet 22 are formed through the first end 14 of the housing 12 to communicate with the indoor environment. A second air outlet 19 is formed through the second end 16 of the housing 12 for expelling heated exhaust HE into the outdoor environment.

The housing 12 includes first and second chambers 30, 32, respectively. The first chamber 30 is in open fluid communication with the first air inlet 18 and the first air outlet 22. The second chamber 32 is in open fluid communication with the second air inlet 20 and the second air outlet 19. As shown in the sole drawing FIGURE, first and second walls 50, 52, respectively, may be disposed within the housing 12 to define the first and second chambers 30, 32, respectively. As shown, the second chamber 32 is defined between second wall 52 and lower wall 60 of housing 12. Preferably, second wall 52 maintains an air-tight barrier between the first chamber 30 and the second chamber 32, the only communication between the first and second chambers 30, 32 being through inlet port 64 and outlet port 66. As will be discussed in greater detail below, the inlet port 64 allows liquid refrigerant to pass from the condenser coil 34 to the evaporator coil 38, and outlet port 66 allows gaseous refrigerant to pass from the evaporator coil 38 to the compressor 36. Further, as shown in the sole drawing FIGURE, the first wall 50 preferably partially divides the first chamber 30 such that the first chamber 30 is substantially U-shaped in section, the open ends of the U-shaped first chamber 30 being defined by the first air inlet 18 and the first air outlet 22 (separated by first wall 50), and a closed end of the U-shaped first chamber 30 being defined by wall 70 of the second end 16 of housing 12.

Compressor 36 and condenser coil 34 are housed within the second chamber 32, as shown. As in a conventional evaporation-condensation cycle air conditioner, the compressor 36 delivers pressurized gaseous refrigerant to the condenser coil 34 to be condensed into liquid refrigerant. Evaporator coil 38 is housed within the first chamber 30 and is in fluid communication with the condenser coil 34 (through inlet port 64) and the compressor 36 (through outlet port 66). As is well known, an expansion valve 62 may be positioned in the line between condenser coil 34 and evaporator coil 38 to selectively lower the pressure of the liquid refrigerant, thus aiding expansion (i.e., change of state) of the liquid refrigerant to a vapor in the evaporator coil 38.

Similar to a conventional air conditioning system, a first filter 22 may be disposed within first chamber 30 for filtering ambient air AA prior to its cooling by evaporator coil 38, and a second filter 24 may similarly be disposed within second chamber 32 for filtering the portion of the cooled air $CA_2$ prior to its heating by condenser coil 34. It should be understood that first and second filters 22, 24 may be any suitable type of air filters. Further, it should be understood that evaporator coil 38, condenser coil 34 and compressor 36 are shown diagrammatically in the sole drawing FIGURE for exemplary purposes only, and that any suitable type of evaporator, condenser and compressor may be used. Similarly, it should be understood that the refrigerant circulating therethrough may be any suitable type of refrigerant or coolant.

A first fan 40 is housed within the first chamber 30 for driving ambient air AA from the indoor environment to enter the first air inlet 18 and be cooled by passing over the evaporator coil 38, thus producing a stream of cooled air $CA_1$. Cooling of the ambient air AA is achieved in a manner similar to that of a conventional evaporation-condensation cycle air conditioner; i.e., through heat exchange between ambient air AA and the liquid refrigerant in evaporator coil 38. Due to the heating of the liquid refrigerant in evaporator coil 38, a phase change occurs, yielding gaseous refrigerant, which then flows to compressor 36.

The first fan 40 further drives the stream of cooled air $CA_1$ to exit the housing 12 through the first air outlet 22, delivering the stream of cooled air $CA_1$ into the indoor environment. As noted above, the first chamber 30 may be substantially U-shaped, as shown, such that the stream of cooled air $CA_1$ can exit the housing 12 adjacent the point at which it entered in the form of warmer ambient air AA.

A second fan 42 is housed within the second chamber 32 for driving cooled indoor air $CA_2$, e.g., a portion of the stream of cooled air $CA_1$. The cooled air $CA_2$ can be recirculated back into housing 12 through second air inlet 20. Second fan 42 draws the portion of the stream of cooled air $CA_2$ into the second air inlet 20 to pass over the condenser coil 34. The portion of the stream of cooled air $CA_2$ that is recirculated through the housing 12 is used to cool the condenser coil 34 while being heated through heat exchange therewith. Heat exchange between the portion of the stream of cooled air $CA_2$ and the pressurized gaseous refrigerant passing through condenser coil 34 produces a stream of heated exhaust HE, and also liquefies the refrigerant in condenser 34, which is then passed to evaporator coil 38 through inlet port 64. The stream of heated exhaust HE is driven by the second fan 42 to exit the housing 12 through the second air outlet 19, out into the outdoor environment.

It should be understood that each of first fan 40 and second fan 42 may be any suitable type of fan, blower or the like. Further, first fan 40 and second fan 42 may be driven by any suitable type of motor or the like. In the example shown in the sole drawing FIGURE, a single motor 44 drives both first fan 40 and second fan 42 through respective first and second drive belts 46, 48. It should be understood that first and second fans 40, 42 may be driven to blow through any suitable type of linkages or mechanical couplings with motor 44.

Similar to a conventional evaporation-condensation cycle air conditioner, the liquid refrigerant is circulated from the condenser coil 34 to the evaporator coil 38, where the liquid refrigerant is evaporated into gaseous refrigerant, which is then circulated to the compressor 36, forming a continuous evaporation-compression-condensation cycle. Unlike conventional air conditioners, however, the air conditioner 10 draws a portion of cooled indoor air $CA_2$ across the condenser coil 34 to cool the condenser coil 34. The lower temperature of the indoor air $CA_2$ can allow the condenser 34 to operate at a lower temperature and pressure than is achievable with conventional air conditioners. Further, the reduced pressure can allow the compressor 36 to pump additional refrigerant and decrease energy usage or electricity consumption.

For example, cooled indoor air having a temperature of 75° F. (23.9° C.) that is taken into the air conditioner 10 can lose at least 25 degrees after being circulated across the condenser. This reduction in condenser temperature can reduce the liquid line temperature by 25 degrees and reduce the pressure. For example, pressure can drop from 278 PSIG to 196 PSIG when the liquid line temperature drops from 125° F. to 100° F. This reduction in pressure can reduce the energy required to compress the refrigerant gas and increase the output of the air conditioner.

It is to be understood that the energy efficient air conditioner is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. An air conditioner, comprising:
   a housing consisting of first and second longitudinally opposed ends, first and second air inlets and a first air outlet formed through the first end of the housing, a second air outlet formed through the second end of the housing, and first and second separate and distinct chambers defined within the housing, the first chamber being in open fluid communication with the first air inlet and the first air outlet, the second chamber being in open fluid communication with the second air inlet and the second air outlet, wherein the housing has an upper wall and a lower wall, first and second internal walls mounted within the housing, the upper wall of the housing, the first internal wall, the second internal wall and the second end of the housing defining a U-shaped first chamber, and the lower wall of the housing and the second internal wall defining the second chamber;
   a compressor housed within the second chamber;
   a condenser coil housed within the second chamber, the condenser coil being in fluid communication with the compressor;
   an evaporator coil housed within the first chamber, the evaporator coil being in fluid communication with the condenser coil and the compressor such that a volume of refrigerant is recirculated through the evaporator coil, the compressor and the condenser coil;
   a first fan housed within the first chamber for driving ambient air to enter the first air inlet and be cooled by passing over the evaporator coil to produce a stream of cooled air, the first fan further driving the stream of cooled air to exit the housing through the first air outlet; and
   a second fan housed within the second chamber for driving a portion of the stream of cooled air to enter the second air inlet to pass over the condenser coil, the portion of the stream of cooled air being heated through heat exchange with the condenser coil to produce a stream of heated exhaust, the second fan further driving the stream of heated exhaust to exit the housing through the second air outlet.

2. The energy efficient air conditioner as recited in claim 1, further comprising an inlet port and an outlet port extending through the second internal wall, a liquid stream of the refrigerant flowing from the condenser coil to the evaporator coil through the inlet port, and a gaseous stream of the refrigerant flowing from the evaporator coil to the compressor through the outlet port.

3. The energy efficient air conditioner as recited in claim 1, further comprising a first air filter mounted in the first chamber adjacent the first air inlet.

4. The energy efficient air conditioner as recited in claim 3, further comprising a second air filter mounted in the second chamber adjacent the second air inlet.

5. The energy efficient air conditioner as recited in claim 1, further comprising a motor mounted in the housing, the motor being coupled to and driving the first and second fans.

* * * * *